United States Patent
Leone

(10) Patent No.: US 9,624,858 B2
(45) Date of Patent: Apr. 18, 2017

(54) SYSTEMS AND METHODS FOR ENGINE CONTROL BASED ON ENGINE OIL VISCOSITY

(71) Applicant: Ford Global Technologies, LLC, Dearborn, MI (US)

(72) Inventor: Thomas G. Leone, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 749 days.

(21) Appl. No.: 14/011,665

(22) Filed: Aug. 27, 2013

(65) Prior Publication Data
US 2015/0066332 A1 Mar. 5, 2015

(51) Int. Cl.
| F02D 41/00 | (2006.01) |
| F02D 41/04 | (2006.01) |
| F02D 31/00 | (2006.01) |
| F01M 11/10 | (2006.01) |

(52) U.S. Cl.
CPC .......... *F02D 41/04* (2013.01); *F02D 31/003* (2013.01); *F01M 11/10* (2013.01); *F02D 2200/023* (2013.01); *F02D 2200/1006* (2013.01); *F16N 2200/12* (2013.01)

(58) Field of Classification Search
CPC .......... F02D 41/04; F02D 41/06; F02D 41/08; F02D 41/16; F02D 31/003; F02D 2200/1006; F02D 2200/023; F02D 2200/024; F01M 11/10; F16N 2200/12
See application file for complete search history.

(56) References Cited

U.S. PATENT DOCUMENTS

| 4,815,340 | A | | 3/1989 | Iwatsuki et al. |
| 5,992,382 | A | * | 11/1999 | Bruedigam ............. F01P 11/14 123/396 |
| 6,732,572 | B1 | * | 5/2004 | Pickert ................... F01M 11/10 73/53.05 |
| 7,761,213 | B2 | | 7/2010 | Kwon |
| 9,175,595 | B2 | * | 11/2015 | Ceynow ................. F01M 5/005 |
| 2012/0180456 | A1 | * | 7/2012 | Yamada ................ B60W 10/30 60/274 |
| 2015/0066332 | A1 | * | 3/2015 | Leone ..................... F02D 41/04 701/102 |
| 2015/0105995 | A1 | * | 4/2015 | Leone ................. F02D 41/2451 701/103 |
| 2015/0105996 | A1 | * | 4/2015 | Leone ................. F02D 41/2451 701/103 |

OTHER PUBLICATIONS

Leone, Thomas G., "Viscosity Detection Using SUMP," U.S. Appl. No. 14/054,701, filed Oct. 15, 2013, 61 pages.
Leone, Thomas G. et al., "Viscosity Detection Using Starter Motor," U.S. Appl. No. 14/054,706, filed Oct. 15, 2013, 61 pages.

\* cited by examiner

*Primary Examiner* — Hieu T Vo
*Assistant Examiner* — Sherman Manley
(74) *Attorney, Agent, or Firm* — Julia Voutyras; McCoy Russell LLP

(57) ABSTRACT

A method, comprising: setting an engine intake airflow parameter based on an engine oil viscosity index. In this way, engine operating conditions that depend on engine friction and engine intake airflow, such as engine idling speed and engine friction torque, may be determined and implemented with an increased consistency. This in turn may decrease the possibility of engine stalls and improve engine performance, particularly at low temperatures.

15 Claims, 5 Drawing Sheets

SYSTEMS AND METHODS FOR ENGINE CONTROL BASED ON ENGINE OIL VISCOSITY

BACKGROUND AND SUMMARY

Engine oil viscosity has a direct effect on engine friction, which in turn affects engine idle speed and engine torque output. Engine oil viscosity also affects oil pressure and systems which rely on oil pressure to operate, for example variable camshaft timing (VCT) systems. Engine control strategies, including engine idle speed control and electronic throttle control, therefore must compensate for changes in engine oil viscosity (and/or engine friction) in order to properly determine the amount of air and fuel required to achieve a given idle speed or torque output.

Traditional engine oils have a relatively low viscosity index. That is, the oil viscosity changes significantly with changes in oil temperature. As such, many engine control strategies include temperature modifiers in order to compensate for changes in engine oil viscosity. For example, at lower temperatures (higher viscosity) an increased throttle opening or engine airflow is required to achieve a given engine idle speed or engine torque output compared to running the same engine at a higher temperature (lower viscosity).

Newly developed engine oils may have a higher viscosity index than traditional engine oils, and may display a narrower range of viscosity over a given temperature range. As such, different temperature modifiers may be used than those used for low viscosity index oils. If an engine is refilled with oil having a different viscosity index than expected, the engine control strategies may operate sub-optimally, particularly at low or high oil temperatures. For example, engine control strategies using temperature modifiers for a high-viscosity index oil may command a narrow range of idle throttle openings at low temperature (e.g. cold start conditions). If the engine were refilled with a low-viscosity index oil, the idle speed could be lower than desired, resulting in a stalled engine.

The inventors herein have recognized the above issues and have devised systems and methods to address these issues at least in part. In one example, a method, comprising: setting an engine intake airflow parameter based on an engine oil viscosity index. In this way, engine operating conditions that depend on engine friction and engine intake airflow, such as engine idling speed and engine friction torque, may be determined and implemented with an increased accuracy. This in turn may decrease the possibility of engine stalls and improve engine performance, particularly at low temperatures.

In another example, an engine system comprising: at least one cylinder; at least one piston positioned in the at least one cylinder; an air intake passage coupled to the at least one cylinder; and a controller including instructions to: determine a viscosity of an engine oil in the engine oil system based on a viscosity index of the engine oil and a temperature of the engine oil; and adjust airflow through the air intake passage based on the viscosity of the engine oil. In this way, engine friction may be precisely accounted for based on engine oil viscosity. An engine oil injection system may be coupled to the at least one cylinder. This, in turn, allows for engine intake airflow to be accurately set based on engine speed and load conditions, providing a robust and consistent system that may be adjusted in accordance with changes in engine oil viscosity as the engine temperature increases throughout operation.

In another example, a method for an engine, comprising: during a first condition: increasing engine intake airflow responsive to a first engine oil viscosity and a desired engine idling speed; and during a second condition: decreasing engine intake airflow responsive to a second engine oil viscosity and a desired engine idling speed, the second engine oil viscosity lower than the first engine oil viscosity. In this way engine idle speed can be controlled precisely based on engine oil viscosity, even under conditions where the engine oil viscosity is not immediately known.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTIONS OF THE DRAWINGS

DETAILED DESCRIPTION

Figure 2:
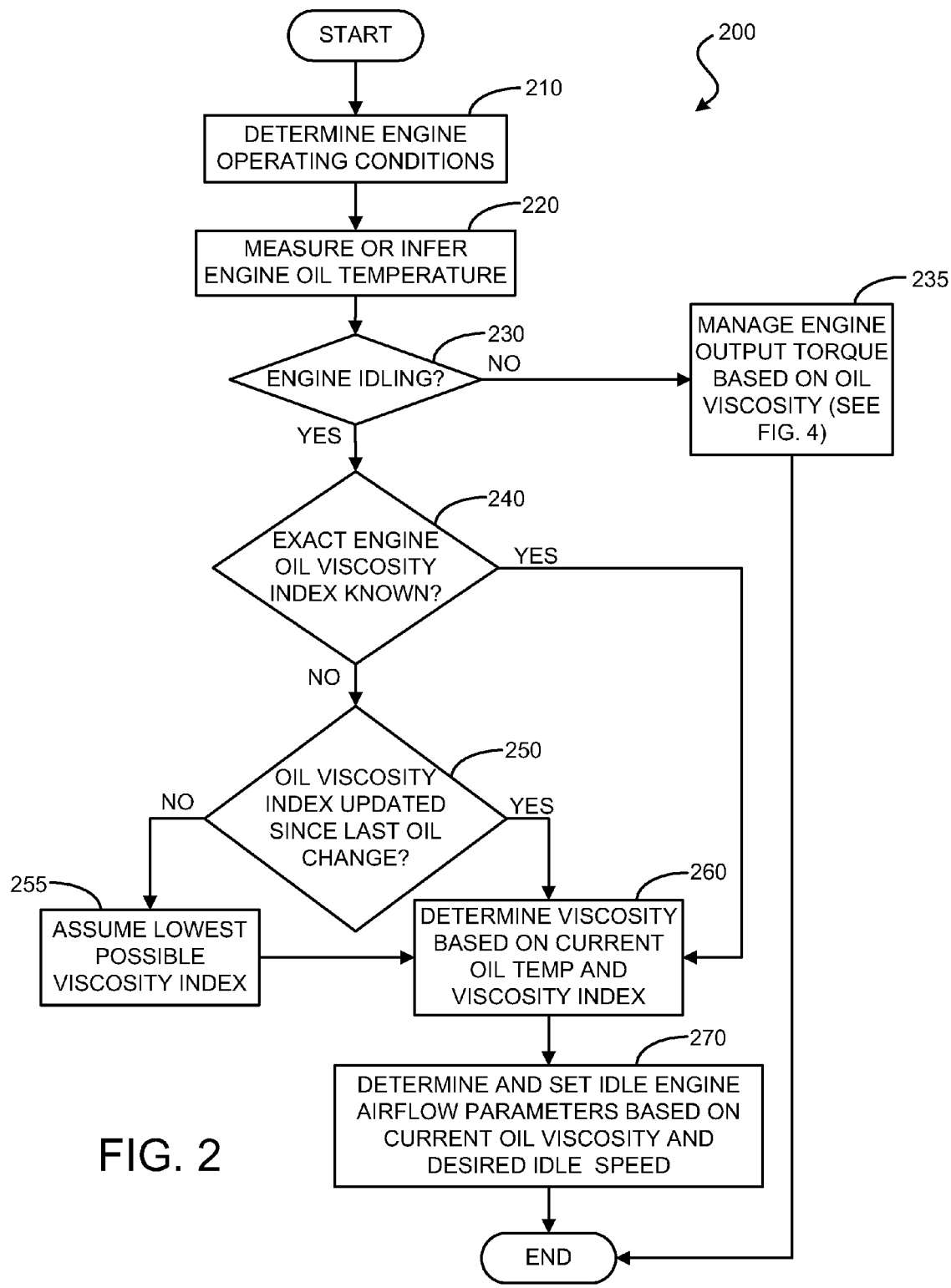
FIG. 2 shows a flow chart for a high-level method for controlling an idling engine based on an engine oil viscosity index.
Figure 3:
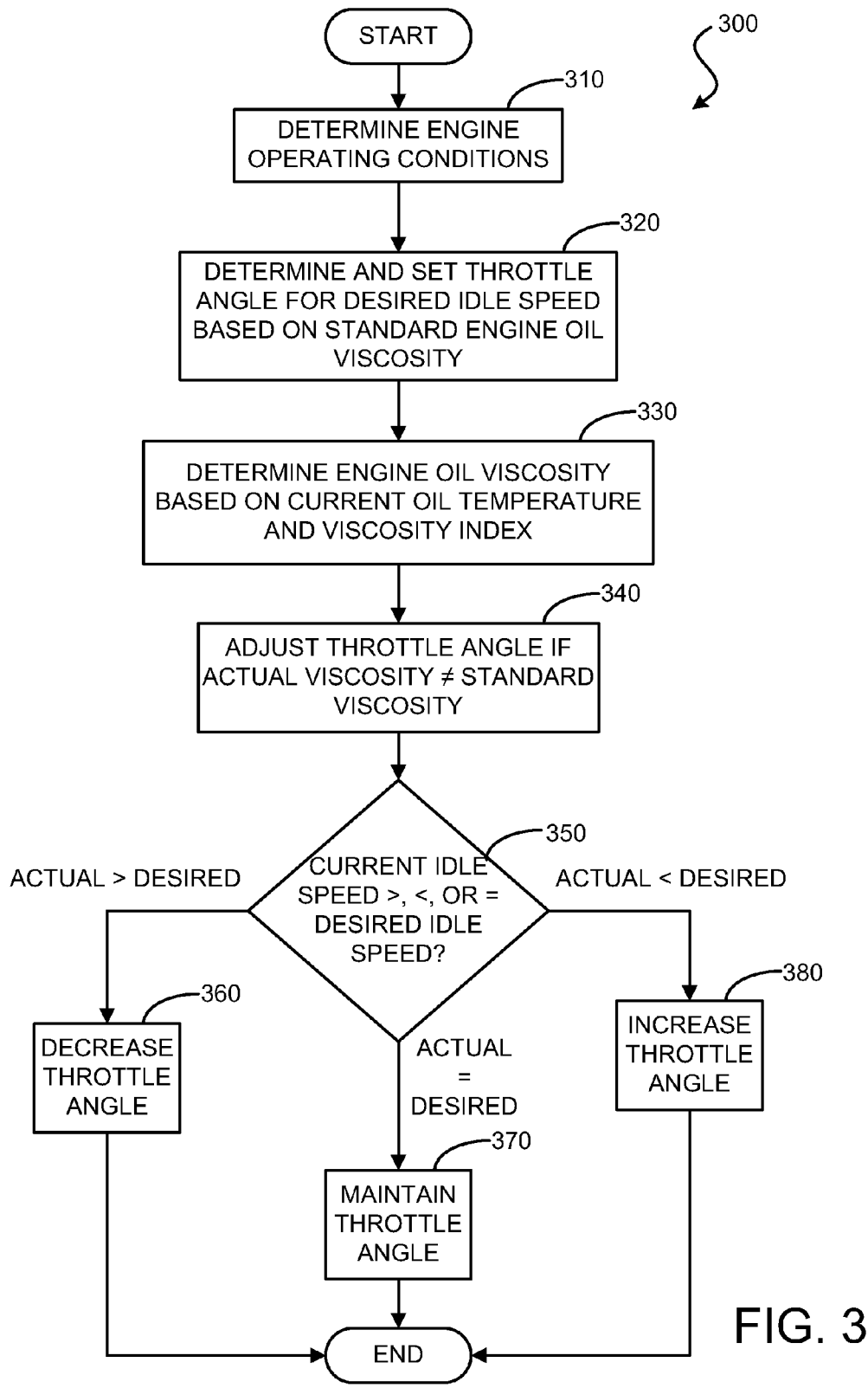
FIG. 3 shows a flow chart for a high-level method for adjusting a throttle position based on engine oil viscosity index.
Figure 4:
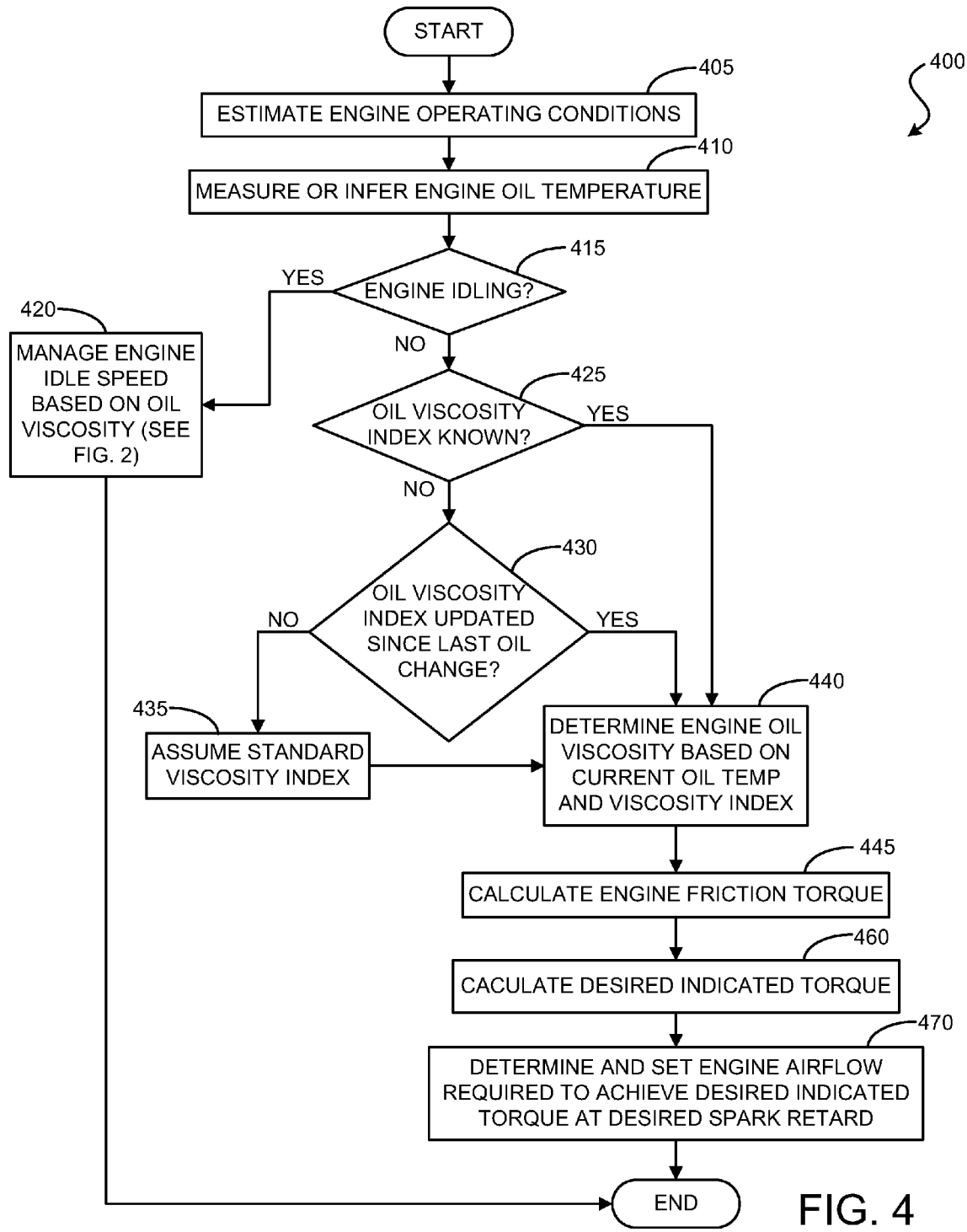
FIG. 4 shows a flow chart for a high-level method for adjusting engine torque based on engine oil viscosity index.
Figure 5B:
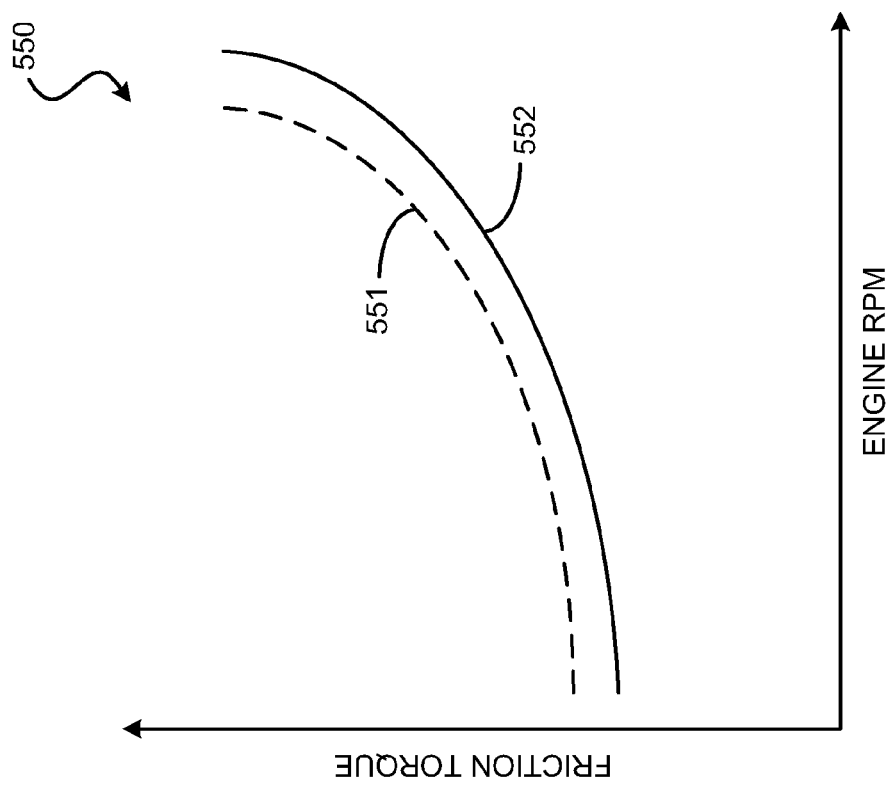
FIG. 5B shows an example lookup map for determining an engine friction torque based on an engine speed at a given engine oil viscosity.
Figure 5A:
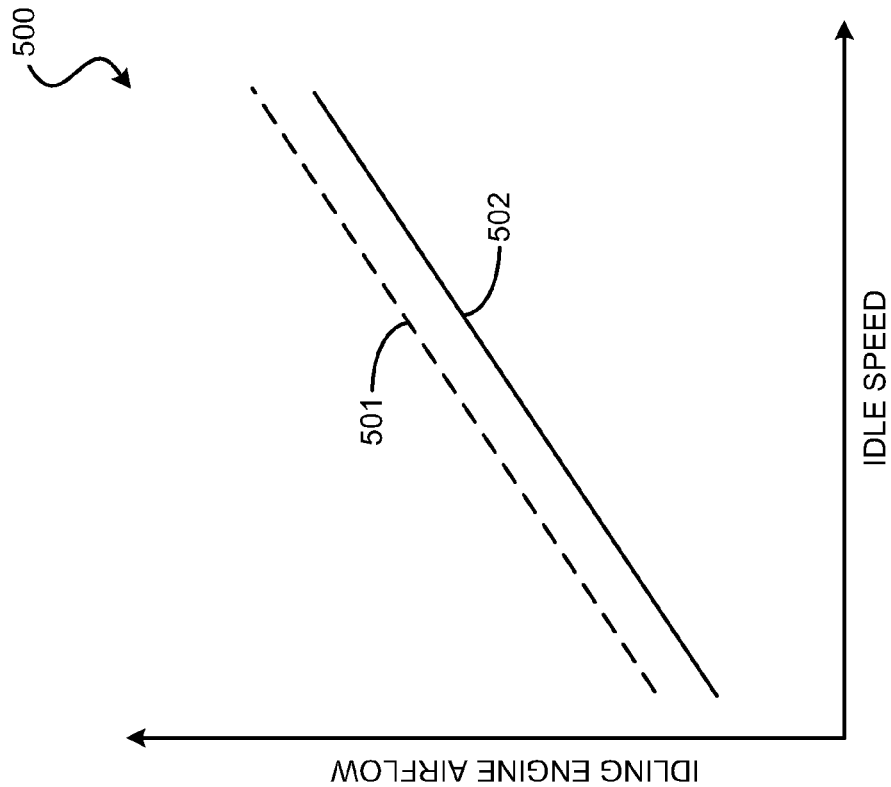
FIG. 5A shows an example lookup map for determining engine airflow of an idling engine based on a desired idle speed at a given engine oil viscosity.

The following description relates to controlling an internal combustion engine based on engine oil viscosity index. As shown in the example embodiment of FIG. 1, an engine system may include a variable flow oil pump operated by a control system. The control system may include a plurality of engine control strategies and methods stored in memory. FIG. 2 depicts an example high level method for controlling engine idle speed and engine intake airflow based on engine oil viscosity index. FIG. 3 depicts an additional example high level method for managing engine idle speed. FIG. 4 depicts an example method for controlling engine torque output and engine intake airflow based on engine oil viscosity index. FIG. 5A shows an example lookup map for determining engine airflow for a desired engine speed at a given engine oil viscosity. Similarly, FIG. 5B shows an example lookup map for determining engine friction torque for a desired engine speed at a given engine oil viscosity. The methods shown in FIGS. 2-4 and the lookup maps shown in FIGS. 5A-B may be stored in a controller of the engine system depicted in FIG. 1 as part of a system for controlling an engine based on engine oil viscosity index.

Figure 1:
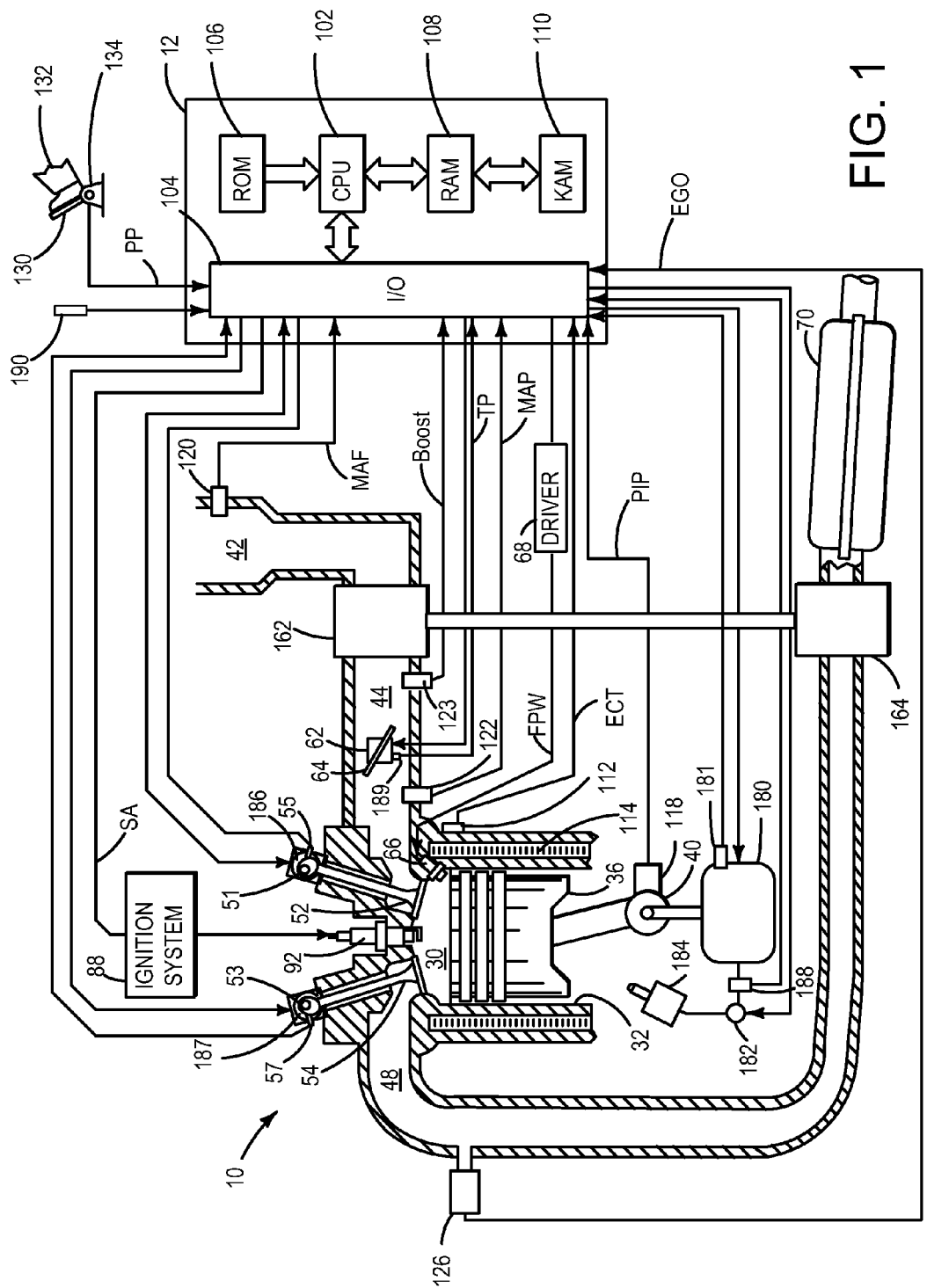
FIG. 1 shows a schematic diagram of an example embodiment of an engine system of the present disclosure.

FIG. 1 is a schematic diagram showing one cylinder of multi-cylinder engine 10, which may be included in a propulsion system of an automobile. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. For example, valve operation may be varied as part of pre-ignition abatement or engine knock abatement operations. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

In one example, cam actuation systems 51 and 53 are variable cam timing systems that include cam phasers 186 and 187 that are hydraulically actuated via oil from a variable flow oil pump 180. Under some conditions, an output flow rate of variable flow oil pump 180 may be varied to control a response time for cam phasers 186 and 187 to change a position of the cams based on operating conditions. For example, under high engine loads, the output flow rate of the variable flow oil pump 180 may be increased, so that the cam phasers 186 and 187 change position more quickly and correspondingly change a position of the cams more quickly than under low engine loads.

Engine 10 may further include a compression device such as a turbocharger or supercharger including at least a compressor 162 arranged along intake manifold 44. For a turbocharger, compressor 162 may be at least partially driven by a turbine 164 (e.g. via a shaft) arranged along exhaust passage 48. For a supercharger, compressor 162 may be at least partially driven by the engine and/or an electric machine, and may not include a turbine. Thus, the amount of compression provided to one or more cylinders of the engine via a turbocharger or supercharger may be varied by controller 12. A boost sensor 123 may be positioned downstream of the compressor in intake manifold 44 to provide a boost pressure (Boost) signal to controller 12.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail. In some embodiments, combustion chamber 30 may alternatively or additionally include a fuel injector arranged in intake manifold 44 in a configuration that provides what is known as port injection of fuel into the intake port upstream of combustion chamber 30. Fuel injector 66 may be controlled to vary fuel injection in different cylinder according operating conditions. For example, controller 12 may command fuel injection to be stopped in one or more cylinders as part of pre-ignition abatement operations so that combustion chamber 30 is allowed to cool. Further, intake valve 52 and/or exhaust valve 53 may be opened in conjunction with the stoppage of fuel injection to provide intake air for additional cooling.

Intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Controller 12 may vary signal SA based on operating conditions. For example, controller may retard signal SA in order to retard spark in response to an indication of engine knock as part of engine knock abatement operations. Though spark ignition components are shown, in some embodiments, combustion chamber 30 or one or more other combustion chambers of engine 10 may be operated in a compression ignition mode, with or without an ignition spark.

Variable flow oil pump 180 can be coupled to crankshaft 40 to provide rotary power to operate the variable flow oil pump 180. In one example, the variable flow oil pump 180 includes a plurality of internal rotors (not shown) that are eccentrically mounted. At least one of the internal rotors can be controlled by controller 12 to change the position of that rotor relative to one or more other rotors to adjust an output flow rate of the variable flow oil pump 180 and thereby adjusted the oil pressure. For example, the electronically controlled rotor may be coupled to a rack and pinion assembly that is adjusted via the controller 12 to change the position of the rotor. The variable flow oil pump 180 may selectively provide oil to various regions and/or components of engine 10 to provide cooling and lubrication. The output flow rate or oil pressure of the variable flow oil pump 180 can be adjusted by the controller 12 to accommodate varying operating conditions to provide varying levels of cooling and/or lubrication. Further, the oil pressure output from the variable flow oil pump 180 may be adjusted to reduce oil consumption and/or reduce energy consumption by the variable flow oil pump 180.

It will be appreciated that any suitable variable flow oil pump configuration may be implemented to vary the oil pressure and/or oil output flow rate. In some embodiments, instead of being coupled to the crankshaft 40 the variable flow oil pump 180 may be coupled to a camshaft, or may be powered by a different power source, such as a motor or the like. In some examples, a conventional (non-variable) oil pump may be used.

Oil injector 184 may be coupled downstream of an output of the variable flow oil pump 180 to selectively receive oil from the variable flow oil pump 180. In some embodiments, the oil injector 184 may be omitted, or it may be incorporated into the combustion chamber walls 32 of the engine cylinder and may receive oil from galleries formed in the walls. The oil injector 184 may be operable to inject oil from the variable flow oil pump 180 onto an underside of piston 36. The oil injected by oil injector 184 provides cooling effects to the piston 36. Furthermore, through reciprocation of piston 36, oil is drawn up into combustion chamber 30 to provide cooling effects to walls of the combustion chamber 30. Moreover, oil injector 184 provides oil for lubrication of an interface between piston 36 and combustion chamber 30.

A valve 182 may be positioned between the output of the variable flow oil pump 180 and the oil injector 184 to control flow of oil to the oil injector 184. In some embodiments, the check valve may be integrated into the assembly of the oil injector 184. In some embodiments, the valve 182 may be an electronically actuatable valve that is controlled by controller 12. The valve 182 may be actuatable to enable/disable operation of oil injector 184.

Exhaust gas sensor 126 is shown coupled to exhaust passage 48 upstream of emission control device 70. Sensor 126 may be any suitable sensor for providing an indication of exhaust gas air-fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 48 downstream of exhaust gas sensor 126. Device 70 may be a three way catalyst (TWC), NOx trap, various other emission control devices, or combinations thereof. In some embodiments, during operation of engine 10, emission control device 70 may be periodically reset by operating at least one cylinder of the engine within a particular air-fuel ratio.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; a profile ignition pickup signal (PIP) from Hall effect sensor 118 (or other type) coupled to crankshaft 40; throttle position (TP) from throttle position sensor 189; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft. Moreover, these sensors may be used to derive an indication of engine load.

Furthermore, controller 12 may receive signals that may be indicative of various temperatures related to the engine 10. For example, engine coolant temperature (ECT) from temperature sensor 112 coupled to cooling sleeve 114 may be sent to controller 12. In some embodiments, sensor 126 may provide an indication of exhaust temperature to controller 12. Sensor 181 may provide an indication of oil temperature or oil viscosity to controller 12. One or more of these sensors may provide an indication of an engine temperature that may be used by controller 12 to control operation of the oil injector 184. Controller 12 may receive signals indicative of an ambient temperature from sensor 190. For example, the engine temperature and/or the ambient temperature may be used to control oil injection as will be discussed in further detail below.

Further, controller 12 may receive an indication of oil pressure from pressure sensor 188 positioned downstream of an output of variable flow oil pump 180. The oil pressure indication may be used by the controller 12 to control adjustment of oil pressure by varying an output flow rate of variable flow oil pump 180.

Oil pressure and oil flow rates output by variable flow oil pump 180 may be functions of engine oil viscosity. These factors further influence engine friction, such as the friction between cylinder 30 and cylinder walls 32, or friction between crankshaft 40 and its bearings. In turn, engine friction influences engine torque output and engine idle speed. Different intake air flow rates may be required to produce the same engine torque output given a greater or lesser engine friction load. As such, engine control strategies must estimate or assume engine friction loads to set intake air flow rates. It may thus be desirable to determine engine friction loads precisely as a function of engine oil viscosity. Engine oil viscosity is based on engine oil temperature and engine oil viscosity index. Engine oil viscosity index may be different for different engine oil formulas, and may change over time as engine oil is used within an internal combustion engine.

FIG. 2 shows a flow chart for an example high level method 200 for controlling an engine system, such as engine system 10 as shown in FIG. 1. Method 200 may be configured as computer instructions stored by a control system and implemented by a controller, for example controller 12 as shown in FIG. 1. FIG. 2 will be described in reference to components and features of the example engine detailed in FIG. 1, but it should be recognized that method 200 or other equivalent methods may be performed with respect to a plurality of engine configurations without departing from the scope of this disclosure. Method 200 may be run at key-on or at any point during the course of engine operation. Method 200 may be run repeatedly throughout the course of engine operation.

Method 200 may begin at 210 by measuring or estimating engine operating conditions. As non-limiting examples, the operating conditions may include ambient temperature and pressure, pedal position (PP), engine speed, engine load, engine temperature, mass air flow (MAF), manifold air pressure (MAP), etc.

Continuing at 220, method 200 may include measuring or inferring engine oil temperature. In some embodiments, engine oil temperature may be measured directly, for example by sensor 181. In other embodiments, engine oil temperature may be inferred from other engine operating conditions, such as engine temperature, engine speed, engine load, engine coolant temperature, history of these variables since engine start, etc. Engine oil temperature may be inferred using one or more lookup maps, lookup tables, or algorithms stored in memory in controller 12.

Continuing at 230, method 200 may include determining whether engine system 10 is idling. If the engine is operating, but not idling, method 200 may proceed to 235. At 235, method 200 may include managing engine output torque based on engine oil viscosity. An example subroutine for managing engine output torque based on engine oil viscosity is described herein with regards to FIG. 4.

If the engine is determined to be idling at 230, method 200 may proceed to 240. At 240, method 200 may include determining whether the exact engine oil viscosity index is known. For example, the exact engine oil viscosity index may be known if the engine is brand new, or if a technician has uploaded viscosity index information to controller 12 immediately following an oil change. If the exact engine oil viscosity index is known, method 200 may proceed to 260.

If the exact engine oil viscosity index is not known, method 200 may proceed to 250. At 250, method 200 may include determining whether the viscosity index has been updated since the last oil change. Controller 12 may hold instructions to estimate and update the engine oil viscosity index periodically between oil changes or other input of exact viscosity index information. Engine oil viscosity index may be updated by controller 12 following a testing routine or assessment of engine operating conditions, or may be updated based on the original viscosity index of the engine oil and engine usage history, for example using a viscosity index decay curve or look up map. If the engine oil viscosity index has been updated since the last oil change, method 200 may proceed to 260.

If the engine oil viscosity index has not been updated since the last oil change, method 200 may proceed to 255. At 255, method 200 may include determining the lowest possible viscosity index for the current engine oil and assigning this value as the current viscosity index. The lowest possible viscosity index may be predetermined for a given engine oil, or may be based on engine usage since the last engine oil viscosity index update. When the lowest possible viscosity index has been determined, method 200 may proceed to 260.

At 260, method 200 may include determining the engine oil viscosity based on the current engine oil temperature as measured or inferred at 220 and the current engine oil viscosity index as determined at 240, 250, or 255. Engine oil viscosity may be determined via one or more equations, lookup maps, or lookup tables stored on controller 12.

Continuing at 270, method 200 may include calculating and setting idle engine airflow parameters based on the current engine oil viscosity and desired idle speed. Idle engine airflow parameters may include MAF, MAP, throttle position (TP), etc. and may be determined via one or more equations, lookup maps, or lookup tables stored on controller 12. An example lookup table is shown in FIG. 5A and discussed further herein. Method 200 may then end.

FIG. 3 shows a flow chart for an example high level method 300 for controlling an engine system, such as engine system 10 as shown in FIG. 1. Method 300 may be configured as computer instructions stored by a control system and implemented by a controller, for example controller 12 as shown in FIG. 1. FIG. 3 will be described in reference to components and features of the example engine detailed in FIG. 1, but it should be recognized that method 300 or other equivalent methods may be performed with respect to a plurality of engine configurations without departing from the scope of this disclosure. Method 300 may be run at key-on or at any point during the course of engine operation. Method 300 may be run repeatedly throughout the course of engine operation. Method 300 may be run as an independent routine, or as a subroutine for another method, such as method 200. Method 300 may be run in conjunction with method 200 as a combined method to manage engine idle speed based on engine oil viscosity. Method 300 may be run during engine idling conditions and may be run during conditions where the engine oil viscosity is not immediately known.

Method 300 may begin at 310 by measuring or estimating engine operating conditions. As non-limiting examples, the operating conditions may include ambient temperature and pressure, pedal position (PP), engine speed, engine load, engine temperature, mass air flow (MAF), manifold air pressure (MAP), etc.

Continuing at 320, method 300 may include determining and setting a throttle angle for a desired engine idle speed based on standard engine oil viscosity. The throttle angle may be determined based on standard engine oil viscosity via one or more equations, lookup maps, or lookup tables, such as the lookup map discussed herein and depicted in FIG. 5A. Standard engine oil viscosity may be a predetermined value, or may be based on one or more current engine operating conditions. For example, a standard engine oil viscosity index may be assumed and the standard engine oil viscosity determined based on the standard engine oil viscosity index and the current engine temperature.

Continuing at 330, method 300 may include determining the actual engine oil viscosity based on the current engine oil temperature and viscosity index. Current engine oil temperature and viscosity index may be measured or inferred as described herein with regards to method 200 and FIG. 2.

Continuing at 340, method 300 may include adjusting the throttle angle if the actual viscosity as determined at 330 is not equal to the standard viscosity used to determine throttled angle at 320. Controller 12 may determine the throttle angle based on the actual viscosity via one or more equations, lookup maps, or lookup tables, and adjust if the throttle angle for the desired engine idle speed is different than what was determined for the standard viscosity. This may include increasing the throttle angle if the actual viscosity is greater than the standard viscosity, and/or decreasing the throttle angle if the actual viscosity is less than the standard viscosity. Alternatively, or in addition to adjusting the throttle angle, increasing engine intake airflow may also include increasing volumetric efficiency of the engine by changing valve lift and/or valve timing, decreasing dilution (e.g. EGR), etc. Decreasing engine intake airflow may also include decreasing volumetric efficiency of the engine by changing valve lift and/or valve timing, increasing dilution (e.g. EGR), etc.

Continuing at 350, method 300 may include determining whether the current idle speed is greater than, less than, or equal to the desired idle speed. In this way, the throttle angle can be refined to deliver the desired idle speed for the actual engine oil viscosity. If the current idle speed is greater than the desired idle speed, method 300 may proceed to 360. At 360, method 300 may include decreasing the throttle angle in order to reduce the engine idle speed to the desired idle speed. Method 300 may then end.

Returning to 350, if the current idle speed is equal to the desired idle speed, method 300 may proceed to 370. At 370, method 300 may include maintaining the current throttle angle in order to maintain the engine idle speed at the desired idle speed. Method 300 may then end. Returning to 350, if the current idle speed is less than the desired idle speed, method 300 may proceed to 380. At 380, method 300 may include increasing the current throttle angle in order to increase the engine idle speed to the desired idle speed. Method 300 may then end.

The system of FIG. 1 and the methods of FIGS. 2 and 3 may enable one or more methods for controlling an engine. In one example, a method for an engine, comprising: during a first condition: increasing engine intake airflow responsive to a first engine oil viscosity and a desired engine idling speed; and during a second condition: decreasing engine intake airflow responsive to a second engine oil viscosity and a desired engine idling speed, the second engine oil viscosity being lower than the first engine oil viscosity. Prior to the first or second conditions, the engine intake airflow may be determined based on a standard engine oil viscosity, the standard engine oil viscosity being lower than the first engine oil viscosity and greater than the second engine oil viscosity. The first engine oil viscosity may be based on an engine oil temperature and a first engine oil viscosity index, and the second engine oil viscosity may be based on an engine oil temperature and a second engine oil viscosity index. Increasing engine intake airflow may include increasing the angle of an air intake throttle and decreasing engine intake airflow may include decreasing the angle of the air intake throttle. The method may further comprise: during a third condition: increasing the angle of the air intake throttle if an actual idle speed is less than the desired engine idling speed. The method may further comprise: during a fourth condition: decreasing the angle of the air intake throttle if the actual idle speed is greater than the desired engine idling speed. Increasing engine intake airflow may also include increasing volumetric efficiency of the engine by changing valve lift and/or valve timing, decreasing dilution (e.g. EGR), etc. Decreasing engine intake airflow may also include decreasing volumetric efficiency of the engine by changing valve lift and/or valve timing, increasing dilution (e.g. EGR), etc. The technical result of implementing this method is greater consistency of engine idle speed and a reduced risk of engine stalling, particularly at low idle speeds and/or cold start conditions.

FIG. 4 shows a flow chart for an example high level method 400 for controlling an engine system using electronic throttle control, such as engine system 10 as shown in FIG. 1. Method 400 may be configured as computer instructions stored by a control system and implemented by a controller, for example controller 12 as shown in FIG. 1. FIG. 4 will be described in reference to components and features of the example engine detailed in FIG. 1, but it should be recognized that method 400 or other equivalent methods may be performed with respect to a plurality of engine configurations without departing from the scope of this disclosure. Method 400 may be run at key-on or at any point during the course of engine operation. Method 400 may be run repeatedly throughout the course of engine operation. Method 400 may be run as an independent routine, or as a subroutine for another method, such as method 200. Method 400 may be run in conjunction with method 200 as a combined method to manage engine operations based on engine oil viscosity. Method 400 may be run during actively engaged engine conditions and may be run during conditions where the engine oil viscosity is not immediately known.

Method 400 may begin at 405 by measuring or estimating engine operating conditions. As non-limiting examples, the operating conditions may include ambient temperature and pressure, pedal position (PP), engine speed, engine load, engine temperature, mass air flow (MAF), manifold air pressure (MAP), etc.

Continuing at 410, method 400 may include measuring or inferring engine oil temperature. In some embodiments, engine oil temperature may be measured directly, for example by sensor 181. In other embodiments, engine oil temperature may be inferred from other engine operating conditions, such as engine temperature, engine speed, engine load, engine coolant temperature, history of these variables since engine start, etc. Engine oil temperature may be inferred using one or more lookup maps, lookup tables, or algorithms stored in memory in controller 12.

Continuing at 415, method 400 may include determining whether engine system 10 is idling. If the engine is idling, method 400 may proceed to 420. At 420, method 400 may include managing engine idle speed based on engine oil viscosity. An example subroutine for managing engine idle speed based on engine oil viscosity is described herein with regards to FIG. 2.

If the engine is determined to be actively engaged at 415, method 400 may proceed to 425. At 425, method 400 may include determining whether the exact engine oil viscosity index is known. For example, the exact engine oil viscosity index may be known if the engine is brand new, or if a technician has uploaded viscosity index information to controller 12 immediately following an oil change. If the exact engine oil viscosity index is known, method 400 may proceed to 440.

If the exact engine oil viscosity index is not known, method 400 may proceed to 430. At 430, method 400 may include determining whether the viscosity index has been updated since the last oil change. Controller 12 may hold instructions to estimate and update the engine oil viscosity index periodically between oil changes or other input of exact viscosity index information. Engine oil viscosity index may be updated by controller 12 following a testing routine or assessment of engine operating conditions, or may be updated based on the original viscosity index of the engine oil and engine usage history, for example using a viscosity index decay curve or look up map. If the engine oil viscosity index has been updated since the last oil change, method 400 may proceed to 440.

If the engine oil viscosity index has not been updated since the last oil change, method 400 may proceed to 435. At 435, method 400 may include determining the standard viscosity index for the current engine oil and assigning this value as the current viscosity index. The standard viscosity index may be predetermined for a given engine oil, or may be based on engine usage since the last engine oil viscosity index update. When the standard viscosity index has been determined, method 400 may proceed to 440.

At 440, method 400 may include determining the engine oil viscosity based on the current engine oil temperature as measured or inferred at 410 and the current engine oil viscosity index as determined at 425, 430, or 435. Engine oil viscosity may be determined via one or more equations, lookup maps, or lookup tables stored on controller 12.

Continuing at 445, method 400 may include determining the engine friction torque based on engine speed and the current engine oil viscosity, as determined at 440. Engine friction torque may be determined via one or more equations, lookup maps, or lookup tables stored on controller 12. An example lookup table is shown in FIG. 5B and discussed further herein.

Continuing at 450, method 400 may include determining the desired indicated torque for the current engine operating conditions. The desired indicated torque may be determined by adding the engine friction torque (as determined at 445) to desired brake torque and any accessory torques. Desired brake torque may be based on pedal position and other current engine operating conditions and may be determined via one or more equations, lookup maps or lookup tables stored on controller 12. Accessory torques may include a transmission torque converter torque, transmission oil pump torque, alternator torque, air conditioning compressor torque, and torque relating to other accessories which are driven by torque from the engine system. Each accessory may have a predetermined accessory torque, or may be determined based on engine operating conditions. Transmission oil pump torque, for example, may also be a function of transmission oil viscosity, which may be based on transmission oil temperature and transmission oil viscosity index.

Continuing at 470, method 400 may include determining and setting the engine airflow required to achieve the desired indicated torque at the desired spark retard. The desired spark retard may be based on desired torque reserve, aftertreatment warm-up or knock avoidance, and may be determined based on engine operating conditions, and the values derived during the execution of method 400. Once the desired spark retard is determined and the airflow required to achieve the desired torque is determined, the throttle position may be set by controller 12 through electronic throttle control. Method 400 may then end.

FIG. 5A depicts an example lookup map 500 for determining idling engine airflow based on desired idle speed for a given engine oil viscosity. Lookup map 500 may be implemented by controller 12 in the form of one or more pre-programmed tables or algorithms. Lookup map 500 may be implemented in the course of an engine control method, such as method 200, as described herein and depicted at 270. Idling engine airflow may represent parameters such as MAF, MAP, and/or throttle position (throttle angle). Idle speed may represent a desired idle speed. The desired idle speed may be predetermined or may be a function of engine operating conditions. Lines 501 and 502 are representative examples of plots determining idling engine airflow based on idle speed for two different engine oil viscosities. Line 501 represents an engine oil with a higher viscosity than the engine oil represented by line 502. As shown by lookup map 500, a higher idling engine airflow is required to achieve a given idle speed when the engine oil has viscosity. In practice, lookup map 500 may include a plurality of lines representing engine oil at a plurality of viscosities. Lines 501 and 502 may represent the same engine oil at different temperatures, or different engine oils with different viscosity indexes at the same temperature.

FIG. 5B depicts an example lookup map 550 for determining engine friction torque based on desired engine RPM for a given engine oil viscosity. Lookup map 550 may be implemented by controller 12 in the form of one or more pre-programmed tables or algorithms. Lookup map 550 may be implemented in the course of an engine control method, such as method 400, as described herein and depicted at 445. The calculated friction torque may further be used to calculate engine airflow parameters required to produce the desired output torque. Engine RPM may represent a desired engine RPM. The desired engine RPM may be predetermined or may be a function of engine operating conditions. Lines 551 and 552 are representative examples of plots determining friction torque based on engine RPM for two different engine oil viscosities. Line 551 represents an engine oil with a higher viscosity than the engine oil represented by line 552. As shown by lookup map 550, a higher friction torque is observed at a given engine RPM when the engine oil has higher viscosity. In practice, lookup map 550 may include a plurality of lines representing engine oil at a plurality of viscosities. Lines 551 and 552 may represent the same engine oil at different temperatures, or different engine oils with different viscosity indexes at the same temperature.

The system of FIG. 1 and the methods of FIGS. 2 and 4 may enable one or more systems and methods. In one example, a method, comprising: setting an engine intake airflow parameter based on an engine oil viscosity index. The method may further comprise: determining an engine oil viscosity based on the engine oil viscosity index and an engine oil temperature. In some examples, the method may further comprise: during an engine idling condition, determining a desired engine idle speed based on the engine oil viscosity and oil temperature, and wherein the engine intake airflow parameter is further based on the desired engine idle speed. The method may further comprise: during an actively engaged engine condition: determining a desired engine RPM; determining an engine friction torque based on the desired engine RPM and the engine oil viscosity. In some embodiments, the method may further comprise: determining a desired indicated torque based on the engine friction torque, a desired brake torque and one or more accessory torques. The engine intake airflow parameter may be further based on the desired indicated torque. The engine intake airflow parameter may be an air intake throttle angle. The technical result of implementing this method is an increased accuracy in determining engine operating conditions, including engine idling speed and engine output torque. This in turn may decrease the possibility of engine stalls and improve engine performance, particularly at low temperatures.

In another example, an engine system comprising: at least one cylinder; at least one piston positioned in the at least one cylinder; an air intake passage coupled to the at least one cylinder; and a controller including instructions to: determine a viscosity of an engine oil in the engine oil system based on a viscosity index of the engine oil and a temperature of the engine oil; and adjust airflow through the air intake passage based on the viscosity of the engine oil. The controller may further include instructions to: during an engine idling condition, determine a desired engine idle speed, and wherein adjusting airflow through the air intake passage is further based on the desired engine idle speed. In some embodiments, the controller may further include instructions to: during an actively engaged engine condition: determine a desired engine RPM; determine an engine friction torque based on the desired engine RPM and the engine oil viscosity. The controller may further include instructions to: determine a desired indicated torque based on the engine friction torque, a desired brake torque and one or more accessory torques. Adjusting airflow through the air intake passage may be further based on the desired indicated torque. Adjusting airflow through the air intake passage may include adjusting the angle of an air intake throttle disposed in the air intake passage. An engine oil injection system may be coupled to the at least one cylinder. The technical result of implementing this system is increased engine control over a plurality of engine oil viscosities and engine oil viscosity indexes. This may include increased fuel economy during an engine idling condition and increased consistency of output torque during an actively engaged engine condition.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
  determining an engine oil viscosity index of engine oil based on whether the engine oil viscosity index was updated at a last oil change, and if not, determining a lowest possible viscosity index for a current engine oil and assigning the lowest possible viscosity index as a current engine oil viscosity index;
  determining an engine oil viscosity based on the engine oil viscosity index and an engine oil temperature during operation; and
  setting an air intake throttle angle based on the engine oil viscosity.

2. The method of claim 1, wherein engine airflow is adjusted responsive to the set air intake throttle angle, the engine airflow delivered to cylinders of an engine, the method further comprising injecting the engine oil onto pistons during engine operation.

3. The method of claim 2, wherein:
  during an engine idling condition, the air intake throttle angle is further based on the engine oil viscosity and a desired engine idle speed, and wherein determining the engine oil viscosity includes using a previously uploaded oil viscosity index if the engine oil viscosity index was updated at the last oil change.

4. The method of claim 2, further comprising:
  during an actively engaged engine condition:
    determining a desired and/or actual engine RPM; and
    determining an engine friction torque based on the desired and/or actual engine RPM and the engine oil viscosity.

5. The method of claim 4, further comprising:
  determining a desired indicated torque based on the engine friction torque, a desired brake torque and one or more accessory torques.

6. The method of claim 5, wherein the air intake throttle angle is further based on the desired indicated torque.

7. An engine system comprising:
  at least one cylinder;
  at least one piston positioned in the at least one cylinder;
  an air intake passage coupled to the at least one cylinder; and
  a controller including instructions to:
    determine an engine oil viscosity index of engine oil responsive to a last engine oil viscosity index update and whether the last engine oil viscosity index update was updated since a last oil change;
    determine a viscosity of an engine oil in an engine oil system based on the determined viscosity index of the engine oil and a temperature of the engine oil; and
    adjust airflow through the air intake passage based on the viscosity of the engine oil via one or more of adjusting an angle of an air intake throttle disposed in the air intake passage, increasing intake valve lift or duration of an intake valve via a variable valve lift system, advancing intake valve opening timing via a variable valve timing system, and combinations thereof.

8. The engine system of claim 7, wherein the controller further includes instructions to:
  during an engine idling condition, determine a desired engine idle speed, and wherein adjusting airflow through the air intake passage is further based on the desired engine idle speed.

9. The engine system of claim 7, wherein the controller further includes instructions to:
  during an actively engaged engine condition:
    determine a desired and/or actual engine RPM; and
    determine an engine friction torque based on the desired and/or actual engine RPM and the viscosity of the engine oil.

10. The engine system of claim 9, wherein the controller further includes instructions to:
  determine a desired indicated torque based on the engine friction torque, a desired brake torque and one or more accessory torques.

11. The engine system of claim 10, wherein adjusting airflow through the air intake passage is further based on the desired indicated torque.

12. A method for an engine, comprising:
  determining a first engine oil viscosity based on a first engine oil temperature and a first engine oil viscosity index;
  determining a second engine oil viscosity index based on engine usage since a last engine oil viscosity index update and a second engine oil viscosity based on a second engine oil temperature and the determined second engine oil viscosity index;

during a first condition:
  increasing engine intake airflow via increasing an angle of an air intake throttle responsive to the first engine oil viscosity and a desired engine idling speed; and
during a second condition:
  decreasing engine intake airflow via decreasing the angle of the air intake throttle responsive to the second engine oil viscosity and a desired engine idling speed, the second engine oil viscosity lower than the first engine oil viscosity.

13. The method of claim 12, wherein, prior to the first or second condition, the engine intake airflow is determined based on a standard engine oil viscosity, the standard engine oil viscosity being lower than the first engine oil viscosity and greater than the second engine oil viscosity.

14. The method of claim 12, further comprising:
during a third condition:
  increasing the angle of the air intake throttle if an actual idle speed is less than the desired engine idling speed.

15. The method of claim 14, further comprising:
during a fourth condition:
  decreasing the angle of the air intake throttle if the actual idle speed is greater than the desired engine idling speed.

* * * * *